United States Patent

Guse

[11] 3,886,708
[45] June 3, 1975

[54] APPARATUS FOR SEALING CONTAINERS

[75] Inventor: Otto Guse, Viersen, Germany

[73] Assignee: Robert Bosch Verpackungsmaschinen G.m.b.H., Waiblingen, Germany

[22] Filed: May 3, 1974

[21] Appl. No.: 466,794

[30] Foreign Application Priority Data
May 7, 1973 Germany............................ 2322947

[52] U.S. Cl..................................... 53/329; 53/373
[51] Int. Cl.².................... B65B 7/28; B65B 51/14
[58] Field of Search ............. 53/329, 373, 287, 282, 53/184, 39, 306, 78, 297, 298

[56] References Cited
UNITED STATES PATENTS
3,338,027  8/1967  Amberg et al...................... 53/39 X Primary Examiner—Travis S. McGehee
Assistant Examiner—Horace M Culver
Attorney, Agent, or Firm—Edwin E. Greigg

[57] ABSTRACT

An apparatus for sealing lids on containers made, at least partially, of thermoplastic material includes a plurality of welding units. Each welding unit has one heated die (electrode) and a holder for receiving a container sought to be sealed. Each welding unit is spaced from adjacent welding units at least by a given distance measured between corresponding points on these welding units. An endless conveyor is provided for supporting and moving the welding units one after another through a welding station, the spacing between adjacent welding units being maintained during movement through the welding station. A fixed cam plate is provided in the welding station, a portion of the cam plate being arranged to cause mutual compression between each one of the heated dies and a corresponding one of said holders so as to press a lid on a container as each welding unit passes through the welding station. That portion of the cam plate which causes the compression is shorter in length than the given distance between the adjacent welding units.

3 Claims, 1 Drawing Figure

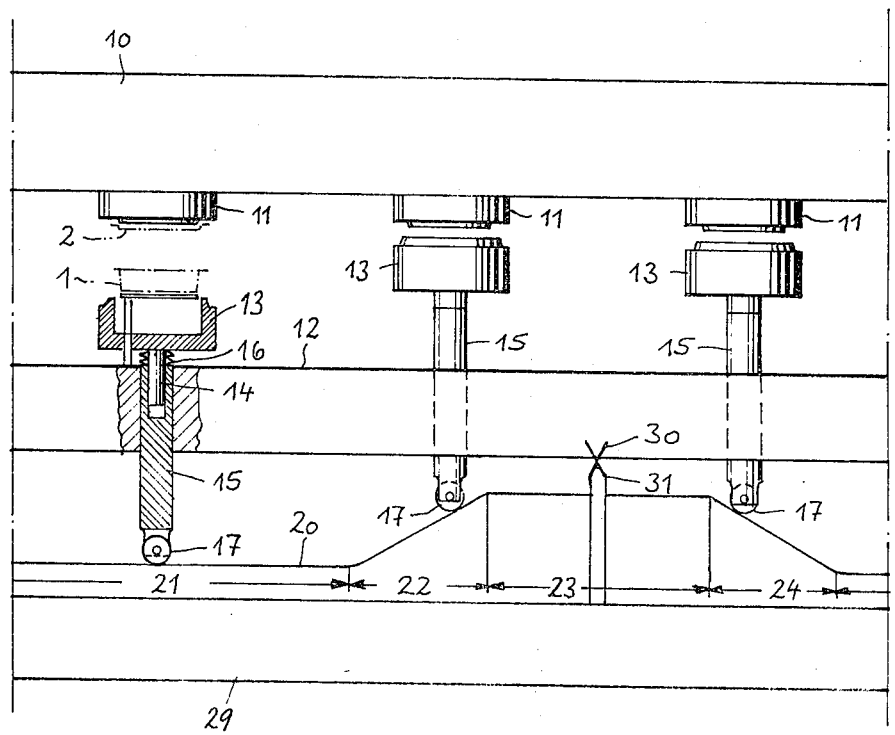

APPARATUS FOR SEALING CONTAINERS

BACKGROUND OF THE INVENTION

This invention relates to an apparatus for sealing lids on containers. The invention relates, more particularly, to an apparatus for sealing lids on containers made, at least partly, of thermoplastic material, the apparatus including several welding units, each having one heated die (electrode) and a holder for receiving a container, the welding units being disposed on an endlessly circulating conveyor, and each heated die being pressed against a corresponding holder over a certain path length defined by a locally fixed cam plate.

In an apparatus for sealing containers of this kind, for example, the apparatus made known from U.S. Pat. No. 3,131,521, the dies and the holders are disposed on endlessly moving conveyor chains. The dies are pressed against corresponding ones of the holders for the purpose of welding one lid to one container as each welding unit passes through a welding station. The pressing is effected by a cam plate acting over a path which is equal to a multiple of several times the distance between any two neighboring welding units. Prior to use, the dies in the apparatus must be heated to operational temperature; this may consume more than 15 minutes. Consequently, at least some of the holders, those which are in direct contact with some of the dies being heated in the welding path, are also heated undesirably to higher temperatures. The result is that, when the apparatus is subsequently put into use, those welding seams of containers which are produced in the welding units whose holders were overheated are themselves overheated. The normally exerted pressure then squeezes thermoplastic material out of the region of the seam. The remaining, overheated material becomes brittle, when the seam cools, so that the welding seams of containers sealed while held in the overheated holders have only limited strength which does not suffice for transport and for handling of the containers. Thus, a considerable number of the containers sealed in the known apparatus must be rejected.

SUMMARY OF THE INVENTION

It is an object of the present invention to provide an apparatus for sealing containers in which heating of any of the container holders by the dies is prevented during preparation of the apparatus for use.

It is another object of the present invention to provide an apparatus for sealing lids on containers which prevents the containers from being overheated by the holders.

It is a further object of the present invention to provide an apparatus for sealing lids on containers which avoids production of sealed containers which are undesirably brittle.

It is an additional object of the present invention to provide an apparatus for sealing lids on containers which avoids the development of weak seams otherwise caused by overheated material.

The foregoing objects, as well as others which are to become clear from the text below, are achieved in accordance with the present invention by providing an apparatus for sealing lids on containers made, at least partially, of thermoplastic material which includes a plurality of welding units. Each welding unit has one heated die (electrode) and a holder for receiving a container sought to be sealed. Each welding unit is spaced from adjacent welding units at least by a given distance measured between corresponding points on these welding units. An endless conveyor is provided for supporting and moving the welding units one after another through a welding station, the spacing between adjacent welding units being maintained during movement through the welding station. A fixed cam plate is provided in the welding station, a portion of the cam plate being arranged to cause mutual compression between each one of the heated dies and a corresponding one of said holders so as to press a lid on a container as each welding unit passes through the welding station. That portion of the cam plate which causes the compression is shorter in length than the given distance between the adjacent welding units.

A salient novel feature of the present invention is that the portion of the cam plate or equivalent which effects the mutual compression of the dies and container holders is shorter than the separation between any two adjacent welding units on the endless conveyor arrangement.

In the apparatus according to the invention, the conveyor arrangement for the dies and the container holders are brought into such a position, prior to heating the dies, in which no holder of the welding units is in contact with its associated heated die. This can occur in simple fashion by observation and by the timely switch-off of the conveyor arrangement.

In a preferred embodiment of the invention, a visible marker is placed in a locally fixed point of the apparatus. Another marker is positioned to be moved in consort with the conveyor arrangement; the conjunction of the two markers indicates the position in which no holder is in contact with any electrode.

BRIEF DESCRIPTION OF THE DRAWING

The sole drawing FIGURE is a side, elevational, linear development view of an apparatus of orbital construction for sealing lids on containers according to an exemplary embodiment of the present invention, the apparatus being illustrated partially in section and simplified for purposes of clarity.

DESCRIPTION OF THE PREFERRED EMBODIMENT

As shown in the drawing, an exemplary embodiment of an apparatus for sealing lids on containers includes the outer surface of a rotatable drum 10. Three heatable dies 11, whose temperature can be adjusted to a particular value and maintained by regulation, are disposed on the other surface of the drum 10, the dies 11 being spaced from one another by equal angular distances of 120°. A rotating table 12 turns coaxially with the drum 10 and with the same angular velocity. The table 12 is equipped with three container holders 13, each of which receives a container 1 which is to be closed and sealed. The holders 13 can be raised or lowered, with respect to an inwardly facing surface of the table 12, within the rotating table 12 so that they may be moved toward respective associated ones of the dies 11. Thus, the holders 13 can be pressed against respective ones of the heated dies 11 and, as a result, lids 2, which have been delivered into the region of action, are welded to the containers 1 in a welding station under the influence of heat and pressure.

Each of the holders 13 has a stud 14, only one being visible in the drawing FIGURE, which is inserted in a bore of a rod 15, which extends through the table 12. A respective disc spring 16 is disposed between each of the holders 13 and a respective one of the rods 15 so that the holders 13 may be pressed against the heated dies 11 in a resilient fashion. The lower ends of the rods 15 are equipped with a respective roller 17 which follows and is supported by an annular cam plate 20 whose operative surface includes a trapezoidal zone 21–24 as viewed in its linear development.

The trapezoidal cam plate 20 has a lower region 21, an ascending ramp region 22, a raised top region 23, and a descending region 24. The regions 22, 23, 24 define a substantial trapezoid, in cross section. The regions 21–24 control the vertical position of the holders 13 with respect to the dies 11 for loading and unloading, as well as for the mutual compression during the rotating of the drum 10 and of the rotating table 12. The upper region 23 of the trapezoidal cam plate 20 extends over an angular sector of 105° width so that the apparatus can assume a position in which no one of the holders 13 is pressed against its associated one of the dies 11. During the time when the rollers 17 are rolling along the lower portion 21 of the trapezoidal cam plate 20, a container 1 and a lid 2 are delivered to the space between each one of the holders 13 and its associated one of the dies 11. When the ascending ramp region 22 is traversed, each individual holder 13 is raised and receives the readied container 1 and brings the extending flange of this container 1 in contact with the also readied lid 2 which is being held to the lower face of the associated corresponding one of the dies 11 by vacuum suction. When traversing the top region of the cam plate 20, each individual holder 13 is pressed against its associated die 11, whereby the exerted pressure and the heat transmitted from the so positioned individual die 11 cause the lid 2 to be welded to the edge of the container 1. On the descending ramp region 24, each of the holders 13, one after another, is again lowered for a purpose of unloading.

Prior to utilization of the apparatus, the drum 10 and the rotating table 12 are placed into a position in which none of the holders 13 touches its associated one of the dies 11 and, while both the drum 10 and rotating table 12 are standing still, the dies 11 are heated to an operational temperature of about 250°C, for example For this purpose, the angular sector included by the top region 23 of the trapezoidal cam plate 20 is chosen to be 105°, which is smaller than the angular separation between corresponding points of the individual ones of the welding units defined by the dies 11 and the holders 13, the angular separation being 120°, as illustrated. In a position of the drum 10 and the rotating table 12 in which one of the rollers 17 of one of the holders 13 is located on the ascending ramp region 22, and a second one of the rollers 17 belonging to a second one of the holders 13 is located on the descending region 24, the holders 13 are separated from the associated dies 11, which are being heated, by approximately 5 mm. This separation suffices to prevent a troublesome heating of the holders 13 by the dies 11.

In order to make it easily possible to place the drum 10 and the rotating table 12 easily into this position, a first visible marker 30 is provided on the rotating table 12 and a second visible marker 31 is provided on a frame 29, which is fixed and supports the cam plate 20.

The two markers 30, 31 become positioned opposite one another in the described desired position. To reach this position, the drum 10 and the rotating table 12 are rotated until the two markers 30, 31 coincide. It is possible to replace the markers 30, 31 by the installation of a limiting switch and a cam which switches off the drive of the drum and table at the correct moment.

It is noted that the aim of the present invention is achieved also by using the described arrangement even in embodiments of an apparatus for sealing in which the holders are also heated, but to a substantially lower temperature, for example 80°C, than the temperature to which the dies of the welding units are heated.

It is to be appreciated that the foregoing described and illustrated preferred embodiment has been set out by way of example, not by way of limitation. Numerous other embodiments and variants are possible without departing from the spirit and scope of the invention, the scope being defined by the appended claims.

That which is claimed is:

1. An apparatus for sealing lids on containers made, at least partially, of thermoplastic material comprising, in combination:
    a. a plurality of welding units, each welding unit including one heated die and a holder for receiving a container sought to be sealed, and each said welding unit being spaced from adjacent welding units by at least a given distance measured between corresponding points on these welding units;
    b. endless conveyor means for supporting and moving said welding units in sequence through a welding station while maintaining substantially spacing between adjacent ones of said welding units; and
    c. fixed cam means in said welding station, a portion of said cam means being arranged to cause mutual compression between each one of said heated dies and a corresponding one of said holders so as to press a lid on a container as each welding unit passes through said welding station, and said portion of said cam means being shorter in length than said given distance between adjacent ones of said welding units.

2. An apparatus as defined in claim 1, further comprising a first marker disposed on said endless conveyor means and a second marker disposed on a locally fixed member, said first and second markers being so positioned with respect to said welding units that substantial coincidence of said markers with one another occurs only when none of said holders is in contact with its associated one of said dies.

3. An apparatus as defined in claim 1, wherein said plurality of welding units consist of three welding units, said dies being located on a rotatable drum constituting a portion of said endless conveyor means, said holders being located on a rotatable table, constituting a portion of said endless conveyor means, the angular separation between said welding units measured between corresponding points on said units being substantially 120°, and wherein said fixed cam means comprises a locally fixed trapezoidal cam plate which controls the relative approach of said dies and said holders, the top portion of said plate which is flat in developed form subtending an angle of substantially 105°.

* * * * *